Sept. 23, 1969 J. W. SCHWARTZ 3,469,024

COLOR TELEVISION RECEIVER WITH HORIZONTAL INDEXING

Filed Nov. 16, 1966

INVENTOR

JAMES W. SCHWARTZ

BY

Dawson, Tilton, Fallon, Lungmus & Alexander

ATT'YS

United States Patent Office 3,469,024
Patented Sept. 23, 1969

3,469,024
COLOR TELEVISION RECEIVER WITH HORIZONTAL INDEXING

James W. Schwartz, Western Springs, Ill., assignor to National Video Corporation, Chicago, Ill., a corporation of Illinois Filed Nov. 16, 1966, Ser. No. 594,896
Int. Cl. H04n *5/38, 5/44*
U.S. Cl. 178—5.4 9 Claims

ABSTRACT OF THE DISCLOSURE

A feedback system for controlling vertical drift in a color television receiver equipped with electron beams scanning horizontal strips of color-producing phosphor. Two additional index beams scan the raster with the video beams, and the intensity of the index beams is not a function of the video signals thereby eliminating intermodulation of the index beams and permitting narrow band signal processing techniques in the feedback circuit to enhance the signal to noise ratio.

Summary

This invention relates to color television systems; and, more particularly, to a color television system utilizing a plurality of sets of horizontal, color-producing phosphor bands or strips wherein each strip within a set emits a different color of light responsive to an impinging electron beam.

The use of such horizontal, strip-like elements has been recognized as having many advantages, particularly in the manufacturing aspects of color television tubes. A significant problem arises in designing a commercial system in that the horizontally sweeping video beams must be kept on their respective phosphor strips; that is, a high degree of vertical drift control must be achieved. Feedback control systems have been suggested for use in maintaining the vertical position of the video beams. One particular system, that of the Sziklai et al. Patent No. 2,792,521, suggests adding separate tag or index signals to two of the modulating grids of the main color beams. Horizontal strips of ultraviolet-producing phosphor are placed in register with the color-producing phosphor strips, and means are provided for sensing the ultraviolet light produced by the tag signals. A change in the sensed signal is indicative of a vertical drift of the video beams which is then corrected.

However, none of the suggested prior art systems, including the above-mentioned one, have developed to the point of commercial utility despite the significant production advantages to such systems because these prior systems have been unable to overcome the vertical stability problem. A difficult problem results from the nonlinearities in the transfer characteristics of the television tube which may cause intermodulation products in the sensed displacement signal as the color intensity varies.

A principal object of the present invention is to provide a color television system adapted for use with sets of horizontal strip-like elements, each element within a set emitting a separate color of light responsive to an impinging electron beam wherein the vertical position of the video beams is continuously corrected through a feedback system to prevent vertical drift.

Briefly, the present invention accomplishes the above object and overcomes the difficulties encountered in the prior art by providing two electron beams in addition to the beams carrying the video signals. Each beam is balanced modulated with a separate index signal, and the system is therefore independent of the video content of the main beams. Since the index beams are not affected by the video signals on the other beams, their levels remain constant, thereby maintaining a constant operating point on the transfer characteristic of the kinescope and eliminating the intermodulation of the index signals. Conventional circuitry is then employed to shift all five beams in unison to correct for vertical drift.

Other objects and advantages of the present invention will be apparent to persons skilled in the art from the following detailed description accompanied by the attached drawing in which.

Description

Figure 1:
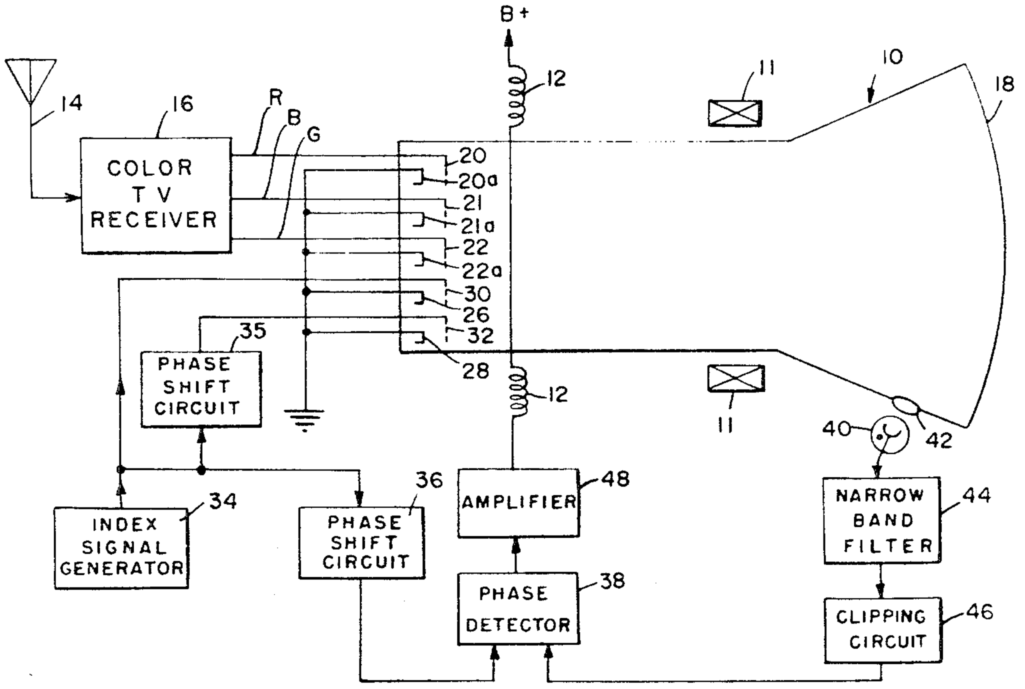
FIG. 1 is a schematic representation of a color television receiving system, partially in block diagram form, according to the present invention.

Referring then to the drawing, and particularly to FIG. 1 in which the arrows represent the direction of signal flow, a cathode-ray tube or kinescope, generally designated as 10, is equipped with a main deflection yoke 11 and a separate vernier deflection coil 12 for vertical deflection only.

The video signals are received via an antenna 14 and processed in a conventional color TV receiver, shown in block diagram and designated as 16. The output signals of color TV receiver 16 are three separate video signals containing the red, blue and green components of the composite video signal which is to be displayed on the screen 18 of the kinescope 10. The respective red, blue and green video signal lines are designated R, B, and G, and they are separately fed to control grids 20, 21 and 22 of the kinescope 10. The cathodes which supply the beam current for grids 20, 21 and 22 are designated as 20*a*, 21*a*, and 22*a*, respectively; and these cathodes are all coupled directly to ground.

The screen 18 has on its inner surface the horizontal strip-like elements which ultimately produce the color image in response to impinging electron beams. The beams controlled by the three grids 20, 21 and 22 traverse the horizontal strip-like elements on the face 18 of tube 10, and they are maintained within a single group or set of such elements in order to generate a true representation of the received video picture.

In the present invention, two additional beams are provided on the color kinescope for generating a displacement signal representative of the vertical position of the main color beams controlled by grids 20, 21 and 22 relative to a given set of color-producing phosphors. These two additional index beams are shown in FIG. 1 as comprising cathodes 26 and 28 together with their respective control grids 30 and 32. The location of the index beams on the screen relative to the three color-producing beams is not important except that the pattern be constant during horizontal scanning of the screen 18. In order to prevent spurious video images it is preferred that the intensity of the index beams be low relative to the average intensity of the color beams.

An index signal generator 34, which may be a conventional oscillator generates the index signals. The output of generator 34 is fed to control grid 30 directly and to control grid 32 through a conventional phase shift circuit 35 which causes a 120° phase shift from the index signal applied to control grid 30. The cathodes 26 and 28 of the two index beams are also at ground potential. The output of generator 34 is also fed to a second phase shift circuit 36 which shifts the phase of the index signal by 60° (one half of the phase shift caused by the phase shift circuit 35) plus the delay required for the index signal to propagate through the kinescope and sensing and clipping circuits. The output of phase shift circuit 36 is a reference signal which is in phase with the composite signal summed up by the photocell (described below) when the video beams are in proper vertical alignment. This reference signal is fed to a phase detector 38 for detecting vertical drift of the beams.

The generator 34 generates a constant signal having a frequency of 5.4 megacycles which is outside of the frequency spectrum of the video signals on the main video beams. The index beams impinge on the ultraviolet phosphor deposited on the screen 18 of the kinescope 10. The placement of the ultraviolet phosphor may be according to methods already suggested in the prior art; but for purposes of illustration, a specific scheme will be described below.

In either case, a photocell 40 receives the ultraviolet signal through an opening 42 in the kinescope 10. The output signal of the photocell 40 is fed through a narrow band filter 44 to enhance the signal to noise ratio and then through a clipping circuit 46 for removing amplitude variations to the other input of the phase detector 38. The narrow band filter 44 has a center frequency equal to the frequency of the generator 34.

The output of phase detector 38 is an error signal representative of the vertical drift of the beams. This error signal is fed to the input of an amplifier 48 which drives the vernier coils 12 for vertical correction of the beams.

Persons skilled in the art will recognize that the index signal could be signals of different frequencies, rather than different phase, as described, and that any of the commonly known methods for generating a signal representative of the vertical position of the beams on the kinescope screen may be substituted with like results.

Figure 2:
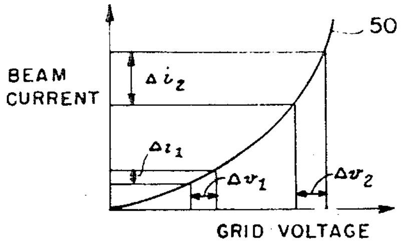
FIG. 2 is a typical plot of beam current against grid voltage representative of each electron beam of a color kinescope.

Referring now to FIG. 2, the operation and advantages of the present invention will be made clear. In FIG. 2 is shown the transfer characteristic of a typical color kinescope. That is, the curve 50 represents the relationship between applied grid voltage and resultant beam current. It can be seen from the drawing that for constant amplitudes of applied grid voltage, designated $\Delta v_1$ and $\Delta v_2$, the resultant beam currents (i.e. $\Delta i_1$ and $\Delta i_2$) have a large disparity in amplitude. If the index signal is superimposed on the video signals, as suggested in the prior art, its operating point will ride up and down the transfer characteristic of the tube as a function of the instantaneous value of the video signal. Since two such index signals are required to determine whether the drift is upward or downward and the video content of each of the associated beams is independent of the other, such a system requires a wide band reference signal for detection. That is, the nonlinear transfer characteristic of the kinescope causes intermodulation of the index signal superimposed on a video beam causing the information to be contained in a wide band signal rather than a constant frequency signal. Hence, the wide band frequency spectrum of the detecting means includes noise caused by the main color beams, as will be seen. Since the intensity of the index signals must be minimized to prevent false color signals, the index signal has a relatively low amplitude; and this wide band detection requirement has reduced the signal to noise ratio in the feedback loop of some prior systems to a point at which commercial development has heretofore not been feasible.

The present invention, by providing for two additional beams in the kinescope which are balanced and modulated solely by the index signals, eliminates the dependency of the index signals upon the video content of the main beams thereby allowing extremely narrow band detection of the resultant displacement signal and enhancement of the signal to noise ratio in the feedback loop.

Another advantage of the present system, as can now be seen, is that the index beams are always energized and will not be lost, as would happen if the index signals were superimposed on the video beams when the video content was low so that the operating point would approach cutoff.

In addition to the above advantages, the present invention, by providing for separate index beams, insures that the average cross section of the index beams remains constant thereby eliminating fluctuation in the sensed displacement signal due to variations in beam cross section which may cause errors for certain beam patterns.

Figure 3:
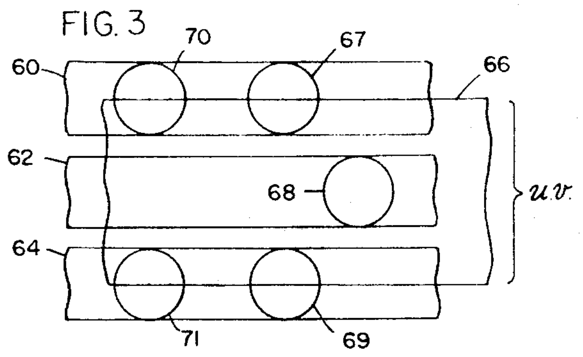
FIG. 3 illustrates one arrangement of the five electron beams of the system of FIG. 1 on the screen of a color television kinescope.

Referring now to FIG. 4, one arrangement of the horizontal strips is illustrated. The red, green and blue strips comprising one group, and designated respectively as 60, 62 and 64, are shown as extending horizontally and slightly separated from adjacent strips for allowing variation in beam cross section. The ultraviolet strip designated as 66, is shown as completely covering the green middle strip 62 and extending approximately half way into the red strip 60 and blue strip 64. The advantage of this particular arrangement, as indicated in my co-pending application entitled "Color Television Apparatus," is that the ultraviolet strip is continuous and of a wider dimension thereby facilitating manufacture of the screen portion of the kinescope. As the red, green and blue electron beams, indicated in cross section as 67, 68, and 69, traverse one group of color strips, the respective index beams (of lower intensity) will also be focused to travel along the red and blue color strips respectively, as illustrated at 70 and 71 in FIG. 3.

If the group of beams drifts upwardly, the beam 70 will cause less ultraviolet light of its phase to be generated, and the beam 71 will cause a more intense ultraviolet light of its phase. The signal sensed by photocell 40 will be predominantly of the phase of that signal which is being generated by beam 71. This will be detected by phase detector 38 which compares the output of photocell 40 with the constant reference signal of phase shift circuit 36, and an error signal, representative of the amount of vertical drift from a predetermined position, will be applied to the entire group of beams by the vernier coil 12 to correct for the drift.

While this invention is susceptible of various conventional modifications, particularly in the frequency suggested for the index signal, the pattern of the beams, the arrangement of the phosphors, the generation of the reference phase signal, the method of shifting the phase of the index signal, the method of sensing vertical position of the beams, etc., without departing from its principle, it is intended that all such modification and equivalent circuitry be covered as embraced within the spirit and scope of the appended claims.

What is claimed is:

1. In a color television receiving system including a kinescope having means for directing a plurality of main electron beams to scan groups of horizontal strips of color-producing elements, the combination comprising: first and second additional electron beam means scanning said kinescope with said main electron beams; means coupled to said first and second additional beam means for modulating the beams thereof with index signals; and sensor means associated with said kinescope for generating an error signal representative of the vertical drift of said first and second additional beams on said kinescope screen.

2. The system of claim 1 further comprising means receiving said error signal for correcting said beams for vertical drift.

3. The system of claim 2 wherein said means for modulating said first and second additional beams comprise an index signal generator; means coupling the output signal of said generator to said first additional beam; first phase shifting means receiving the output signal of said generator for delaying it and for coupling said delayed signal to the second of said additional beams; a phase detector circuit receiving a reference signal from said index signal generator and a signal representative of the vertical displacement of said beams for generating said aforementioned error signal representative of the amount of vertical drift of said beams relative to a given set of color-producing phosphor strips; and vernier deflection means receiving said error signal for correcting vertical drifts of said main and additional beams.

4. The system of claim 2 wherein said index signal generator generates a constant amplitude signal of 5.4 megacycles.

5. The system of claim 4 characterized by the fact that said sensed displacement signal is a narrow band signal.

6. The system of claim 4 further comprising photosensitive means sensing ultraviolet light scintillations at said screen representative of the vertical position of said beams relative to a given group of horizontal strip elements; and a narrow band filter receiving the output signal of said photosensitive means, the output signal of said filter being said aforementioned displacement signal.

7. The system of claim 2 wherein said first and second additional beam means have a quiescent operating point on a segment of the dynamic transfer characteristic of the kinescope for reducing spurious video signals at said screen.

8. In a color television image producing system including a kinescope having means for directing a plurality of main electron beams to scan sets of horizontal strips of color-producing elements, the combination comprising:

first and second electron beam means in said kinescope adapted to scan the raster of said kinescope with said main electron beams;

means coupled to said first and second beam means for modulating the resultant beam with index signals;

means responsive to said index signals for generating a displacement signal representative of the vertical drift of said first and second electron beam means relative to a set of said horizontal strips; and correction means responsive to said displacement signal for correcting the vertical drift of said main beams and said first and second additional beams for forcing said beams to scan said screen in vertical register with said horizontal strips of phosphor.

9. The system of claim 8 characterized by said displacement signal being a narrow band signal having a phase variation relative to said modulating means representative of said vertical displacement.

References Cited

UNITED STATES PATENTS 2,892,020 6/1959 Sziklai ............. 178—5.4

RICHARD MURRAY, Primary Examiner

JOHN MARTIN, Assistant Examiner